(12) United States Patent
Peterson et al.

(10) Patent No.: US 9,340,366 B2
(45) Date of Patent: *May 17, 2016

(54) BULK MATERIAL CONVEYOR BELT SCRAPER AND METHOD OF FORMING THE SAME

(71) Applicant: Martin Engineering Company, Neponset, IL (US)

(72) Inventors: Edwin H. Peterson, Neponset, IL (US); Paul B. Harrison, Neponset, IL (US); Rudolf Beer, Mpumalanga (ZA)

(73) Assignee: Martin Engineering Company, Neponset, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/832,276

(22) Filed: Aug. 21, 2015

(65) Prior Publication Data

US 2016/0052723 A1  Feb. 25, 2016

Related U.S. Application Data

(63) Continuation-in-part of application No. 14/466,574, filed on Aug. 22, 2014.

(51) Int. Cl.
| | | |
|---|---|---|
| *B65G 45/12* | (2006.01) | |
| *B65G 45/16* | (2006.01) | |
| *B32B 37/18* | (2006.01) | |
| *B23K 31/02* | (2006.01) | |

(52) U.S. Cl.
CPC .............. *B65G 45/12* (2013.01); *B65G 45/16* (2013.01); *B23K 31/02* (2013.01); *B32B 37/18* (2013.01)

(58) Field of Classification Search
CPC ......... B65G 45/12; B65G 45/14; B65G 45/16

USPC ................................................... 198/497–499
See application file for complete search history.

(56) References Cited

U.S. PATENT DOCUMENTS

| | | | |
|---|---|---|---|
| 3,342,312 A | 9/1967 | Reiter | |
| 4,838,409 A | 6/1989 | Rappen | |
| 4,927,003 A * | 5/1990 | Swinderman | B65G 45/12 |
| | | | 15/256.5 |
| 4,953,689 A * | 9/1990 | Peterson | B65G 45/16 |
| | | | 15/256.51 |
| 5,197,587 A | 3/1993 | Malmberg | |
| 5,979,638 A | 11/1999 | Wiggins | |
| 6,182,816 B1 | 2/2001 | Gibbs et al. | |
| 6,321,901 B1 * | 11/2001 | Strebel | B65G 45/12 |
| | | | 15/256.5 |
| 7,007,794 B2 * | 3/2006 | Waters | B65G 45/12 |
| | | | 198/497 |
| 7,549,532 B2 | 6/2009 | Ostman | |

(Continued)

FOREIGN PATENT DOCUMENTS

GB          2364985 A     2/2002

OTHER PUBLICATIONS

U.S. Appl. No. 60/124,724, filed Mar. 17, 1999.

*Primary Examiner* — Mark A Deuble

(74) *Attorney, Agent, or Firm* — Thompson Coburn LLP; Clyde L. Smith

(57) ABSTRACT

A bulk material conveyor belt scraper comprises a base portion having a three-sided channel. The belt scraper also comprises a polymeric portion that protrudes outwardly from a corner of the three-sided channel. The three-sided channel of the belt scraper is adapted to engage with and partially encircles a support member having a portion with a square cross-section in a manner such that the support member is able to bias the belt scraper against a conveyor belt.

11 Claims, 7 Drawing Sheets

(56) References Cited

U.S. PATENT DOCUMENTS

| | | | | |
|---|---|---|---|---|
| 8,028,819 B1* | 10/2011 | Swinderman | ............ | B65G 45/16 198/494 |
| 2009/0032371 A1* | 2/2009 | Hoessl | ............ | B65G 45/12 198/497 |
| 2009/0218196 A1* | 9/2009 | Gronvall | ............ | B29C 70/68 198/497 |
| 2010/0126832 A1 | 5/2010 | DeVries | | |
| 2011/0192705 A1* | 8/2011 | Kotze | ............ | B65G 45/16 198/497 |
| 2013/0026008 A1* | 1/2013 | Childs | ............ | B65G 45/12 198/499 |

\* cited by examiner

BULK MATERIAL CONVEYOR BELT SCRAPER AND METHOD OF FORMING THE SAME

CROSS-REFERENCE TO RELATED APPLICATIONS

This application is a continuation-in-part of currently pending U.S. patent application Ser. No. 14/466,574, filed on Aug. 22, 2014.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

The present invention pertains to bulk material conveyor belt scrapers. More specifically, the present invention pertains to a belt scraper that has a polymeric portion and a metal base portion. The metal base portion comprises an opening that extends longitudinally through the metal base portion.

2. General Background

Conveyor belt scrapers are used to remove bulk material clinging to conveyor belts. Belt scrapers are typically provided at the head of conveyor belt assemblies and most are configured to slideably engage with the moving belt to thereby scrape clinging material from the belt. As such, belt scrapers continuously wear and periodically need to be replaced. Thus, the serviceability of belt scraper assemblies is a major factor in selecting a belt scraper assembly. Likewise, the cost of replacement scrapers is a significant factor in the selection of belt scraper assemblies.

SUMMARY OF THE INVENTION

The present invention is directed to a belt scraper that can be easily replaced and even cut to length at a job site. Moreover, the belt scrapers of the present invention can be fabricated efficiently, thereby reducing their cost.

In one aspect of the invention, a bulk material conveyor belt scraper comprises a polymeric portion and a metal base portion. The belt scraper extends longitudinally along a longitudinal axis. The base portion comprises a C-channel portion and a protrusion that extends along the longitudinal axis. The protrusion extends outwardly from a corner of the C-channel portion and defines an opening that extends longitudinally through the base portion of the conveyor belt scraper. The polymeric portion is attached to at least the protrusion of the base portion.

In another aspect of the invention, a bulk material conveyor belt scraper assembly comprises a support member that extends along a longitudinal axis and a belt scraper. The support member comprises a square opening extending longitudinally through the support member. The support member also comprises a longitudinally extending stiffening rib protruding from a corner of the support member. The belt scraper comprises a base portion having a C-channel. The belt scraper also comprises a polymeric portion that protrudes outwardly from a corner of the C-channel. The C-channel of the belt scraper is engaged with and partially encircles the support member in a manner such that the polymeric portion of the belt scraper extends opposite the stiffening rib.

In another aspect of the invention, a method of forming a bulk material conveyor belt scraper comprises welding a first metal channel to a second metal channel. The first channel is a C-channel having an exterior corner. The first metal channel is welded to the second metal channel in a manner such that the second metal channel bridges over the exterior corner of the first metal channel and forms a channel passageway bound by the first and second metal channels. The method further comprises bonding a polymeric material to the second channel after welding the first and second metal channels to each other.

In yet another aspect of the invention, a bulk material conveyor belt scraper comprises a polymeric portion and a metal base portion. The belt scraper extends longitudinally along a longitudinal axis. The base portion comprises a main channel portion that forms two parallel opposing engagement surfaces and an intermediate engagement surface perpendicular to the opposing engagement surfaces. The opposing engagement surfaces and the intermediate engagement surface are parallel to the longitudinal axis. The opposing engagement surfaces and the intermediate engagement surface define a main channel region therebetween and are configured and adapted to collectively contact three sides of a square portion of a support member in a manner preventing the belt scraper from rotating about the support member when such a support member is positioned at least partially in the main channel region. The base portion also comprises a protruding portion that protrudes from the main channel portion and away from the main channel region. The protruding portion is configured and adapted to straddle a corner of the square portion of the support member when the opposing engagement surfaces and the intermediate engagement surface of the base portion contact the support member.

Further features and advantages of the present invention, as well as the operation of the invention, are described in detail below with reference to the accompanying drawings.

Figure 1:
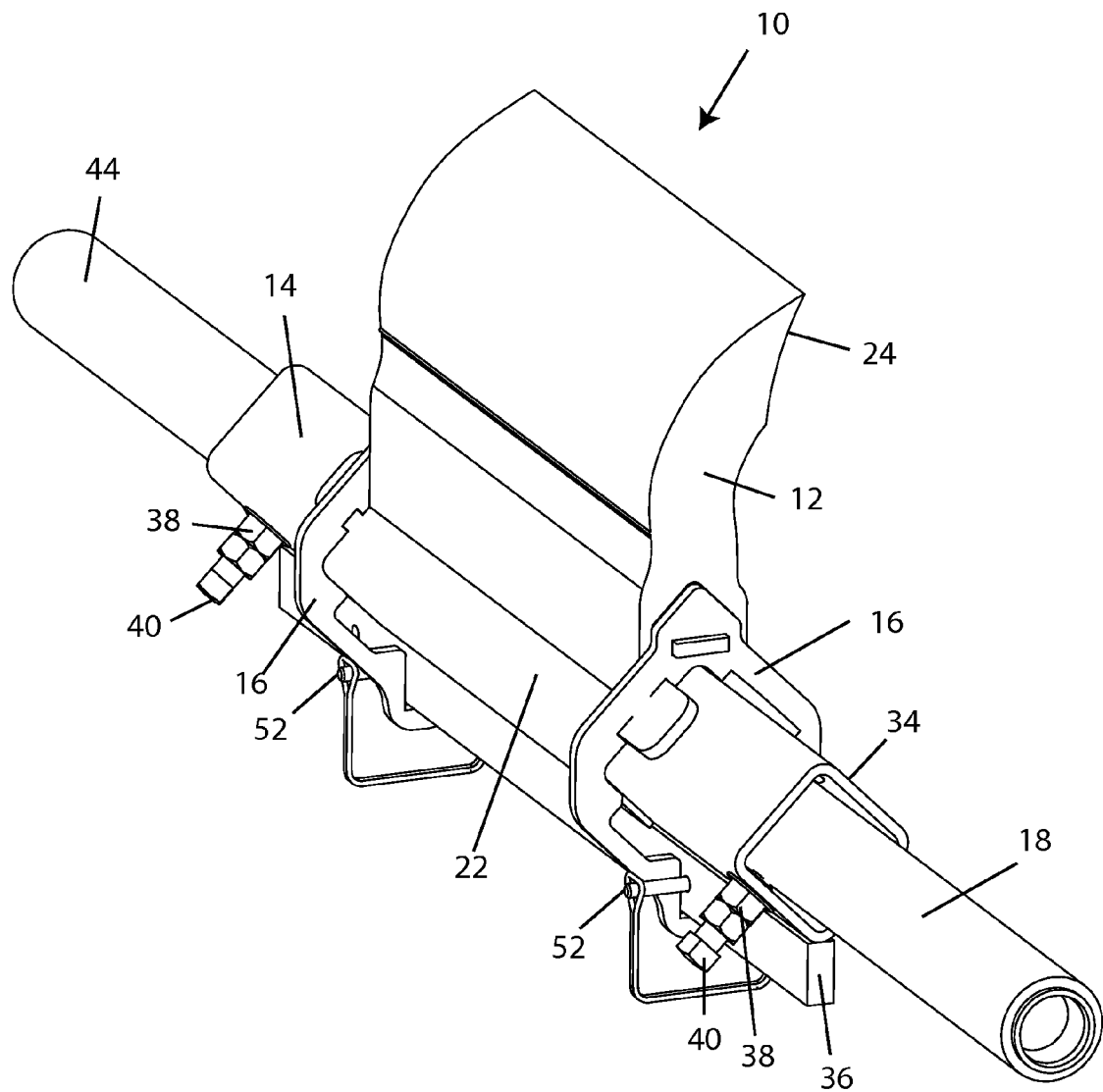
FIG. 1 depicts a perspective view of a bulk material conveyor belt scraper assembly.

Reference numerals in the written specification and in the drawing figures indicate corresponding items.

DETAILED DESCRIPTION

A bulk material conveyor belt scraper assembly 10 in accordance with the invention is shown in FIG. 1. The belt scraper assembly 10 comprises, among other things, a belt scraper 12, a support member 14, securing members 16, and a torsion bar 18.

Figure 2:
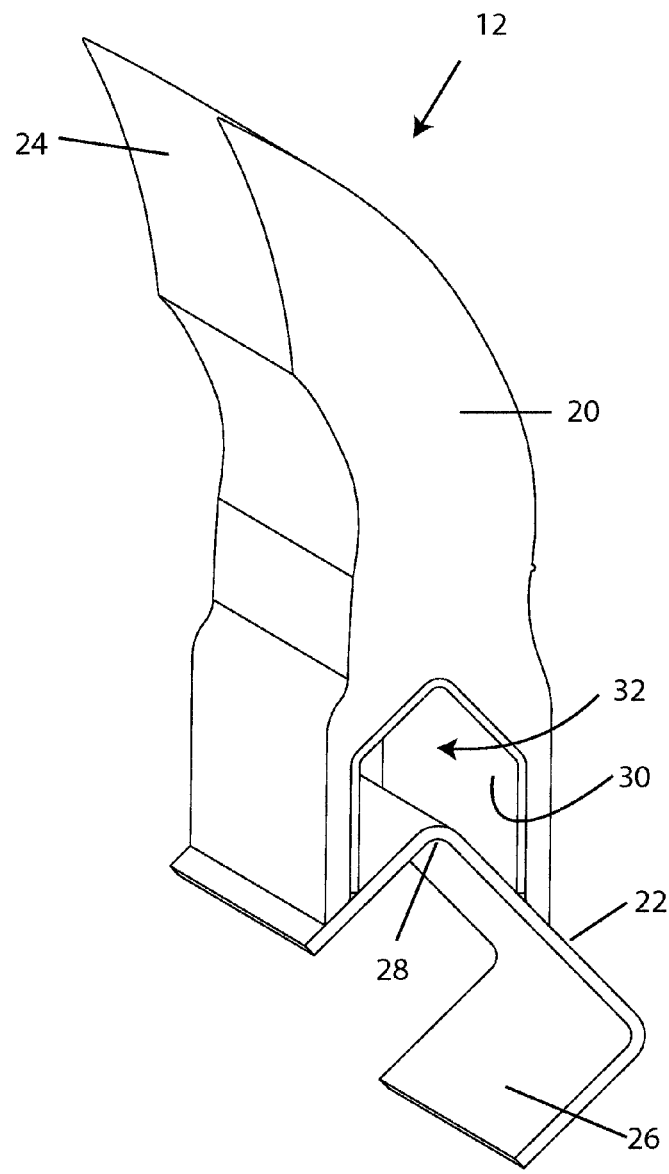
FIG. 2 depicts a perspective view of the belt scraper of the assembly shown in FIG. 1.

The belt scraper 12 is shown by itself in FIG. 2. The belt scraper 12 comprises a polymeric portion 20 and a base portion 22. The polymeric portion 20 is preferably formed of a polyester or polyether material that is over-molded onto the base portion 22. The polymeric portion 20 is preferably chemically cured rather than heat cured, although it could be cured in any manner. The belt scraper 12 also comprises a wear tip 24 opposite the base portion 22. The wear tip 24 is preferably formed by the polymeric portion 20 of the belt scraper 12 and is configured and adapted to engage and slide against a moving conveyor belt to remove bulk material clinging to the belt. Alternatively, the belt scraper 12 may comprise a wear tip insert (not shown) formed out of a different material, such as a tungsten carbide, which can be over-molded by the polymeric portion 20. The resilient nature of the polymeric portion 20 allows wear tip 24 to ride over discontinuities of a typical conveyor belt, without imparting appreciable rotational oscillation to the base portion 22 of the belt scraper 12.

The base portion 22 of the belt scraper 12 is preferably formed of metal. More preferably, the base portion 22 is formed by welding two channel members of metal to each other along their lengths. The first channel member 26 is preferably a standard C-channel having three perpendicular portions. Two of the perpendicular portions intersect at primary corner 28. The second channel member 30 is preferably also a C-channel, except having four portions oriented at forty-five degrees relative to each other. The second channel member 30 preferably straddles the primary corner 28 of the first channel member 26. Thus, a chevron-shaped opening 32 extends longitudinally through the base portion 22 of the belt scraper 12 and is bound by the first and second channel members 26, 30 (albeit the cross-sectional shape of the opening could vary depending on the shapes of the first and second channel members 26, 30). After welding the first and second channel members 26, 30 to each other, the base portion 22 is then placed partially in a mold and the polymeric portion 20 is molded thereon. The polymeric portion 20 becomes adhered to the second channel member 30, and preferably also to the first channel member 26. Although the base portion 22 of the belt scraper is preferably formed by welding two C-channel members to each other, it should be appreciated that it could also be formed via a custom extrusion. It should also be appreciated that the second channel member 30 can occupy space that otherwise would typically be occupied by the polymeric portion 20. Thus, the second channel member 30 both torsionally supports the polymeric portion 20 and reduces the amount of polymeric material, and therefore material cost, required to fabricate the polymeric portion.

The support member 14 comprises a tube portion 34 and a stiffening rib 36. The tube portion 34 preferably has a square cross-section. The stiffening rib 36 preferably extends outwardly from one of the corners of the tube portion 34. In the embodiment shown in FIGS. 1 and 4, the stiffening rib 36 is merely a piece of sheet or plate material that is welded along the length of the tube portion 34. However, the tube portion 34 and the stiffening rib 36 can be formed in other ways. For example, FIG. 5 depicts another embodiment of the support member 14' that is roll forged from an extruded cylindrical tube of material. The stiffening rib 36 increases the bending stiffness of the support member 14 and is configured to carry primarily tension. The tube portion 34 is dimensioned to interlock with the first channel member 26 of the belt scraper 12 as shown such that the support member is able to exert a torque (about the longitudinal axis of the support member 14) on the belt scraper to bias the wear tip 24 of the belt scraper against a conveyor belt. The support member 14 also preferably comprises a plurality of set fittings 38 which, along with set screws 40, secure the support member 14 to the torsion bar 18.

Figure 4:
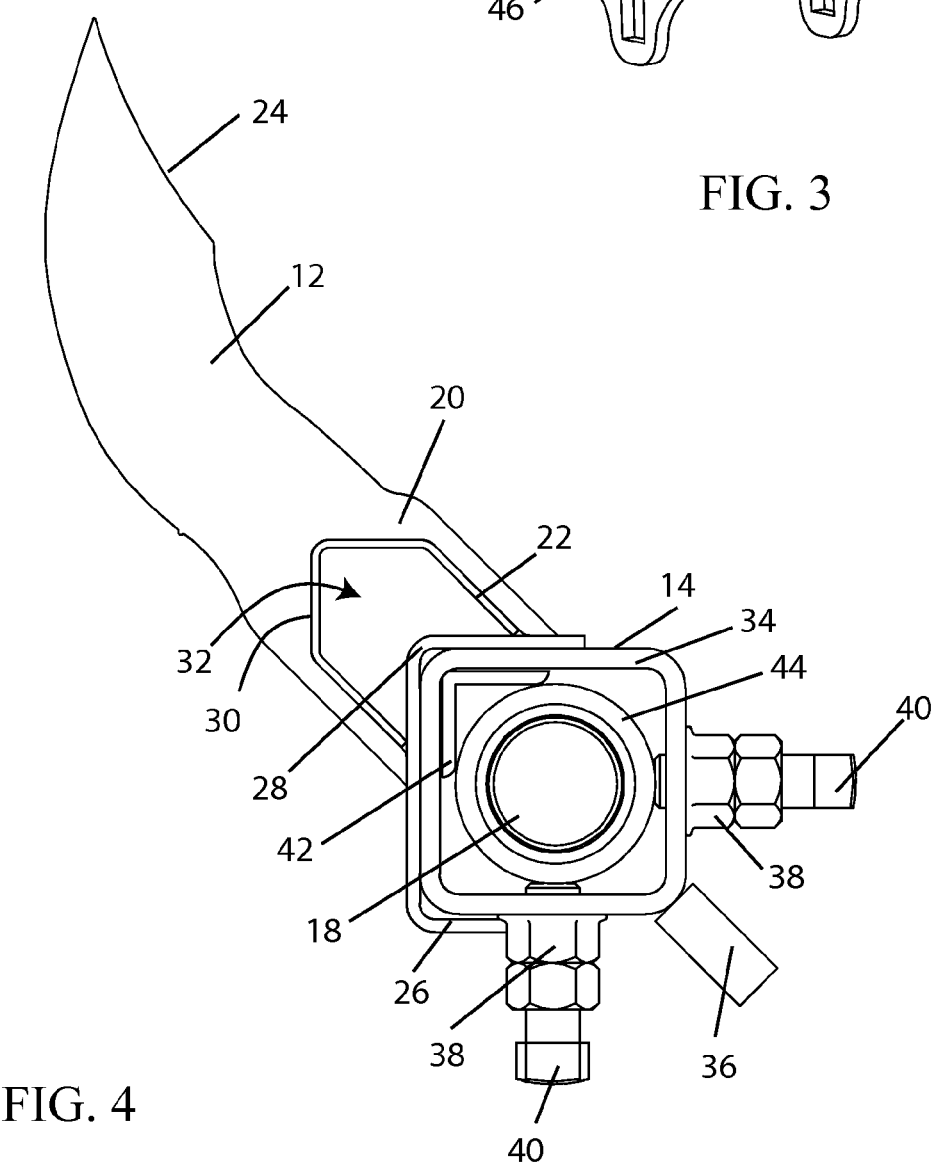
FIG. 4 depicts a side view of the assembly shown in FIG. 1 as viewed parallel to the longitudinal axis of the belt scraper.
Figure 5:
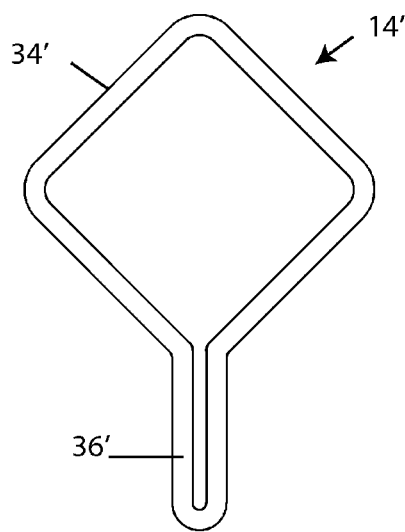
FIG. 5 depicts a roll formed version of a support member that is configured to engage with the belt scraper shown in FIG. 2.

As shown in FIG. 4, the torsion bar 18 is generally cylindrical but also comprises an angle iron 42 extending along its longitudinal length. The angle iron 42 is preferably welded to the cylindrical portion 44 of the torsion bar 18 and prevents rotation between the torsion bar and the support member 14. The set screws 40 of the support member 14 prevent the support member from sliding longitudinally relative to the torsion bar 18.

Figure 3:
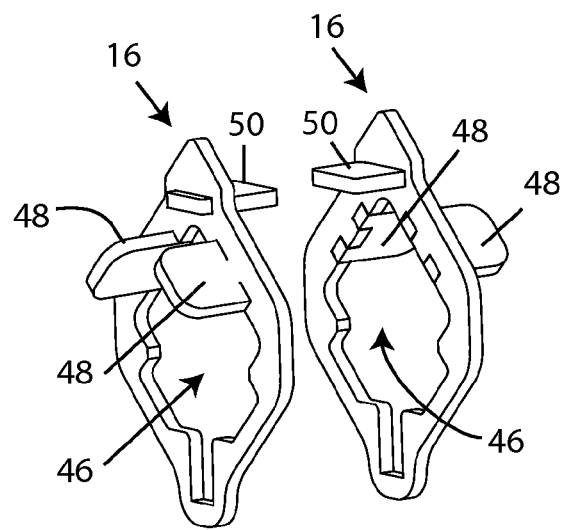
FIG. 3 depicts the locking members of the assembly shown in FIG. 1.

The belt scraper 12 is secured to the support member by the securing members 16, which are shown by themselves in FIG. 3. Each securing member 16 comprises an opening 46 configured to encircle the support member 14. Each securing member 16 also comprises a pair of bracing tabs 48 and a locking tab 50. The bracing tabs 48 are configured to bare against the support member 14 in a manner preventing the securing members 16 from rocking outboard when the securing members are locked in place adjacent to the belt scraper 12. The bracing tabs 48 also make it easier to slide the securing members 16 onto the support member 14 when assembling the securing members to the scraper assembly 10. The locking tabs 50 of the securing members 16 are configured to extend into the opposite ends of the longitudinal opening 32 that extends through the base portion 22 of the belt scraper 12 to thereby secure the belt scraper 12 to the support member 14. However, the locking tabs 50 of the securing members 16 only loosely extend into the opening 32 of the belt scraper 12 and therefore the securing members are not configured to carry the primary belt scraping loads. The primary belt scraping loads are instead carried by contact forces between the first channel member 26 of the base portion 22 of the belt scraper 12 and the support member 14. Releasable locking pins 52 preferably extend through the stiffening rib 36 of the support member 14 to longitudinally secure the securing members 16 in place along the support member.

Figure 6:
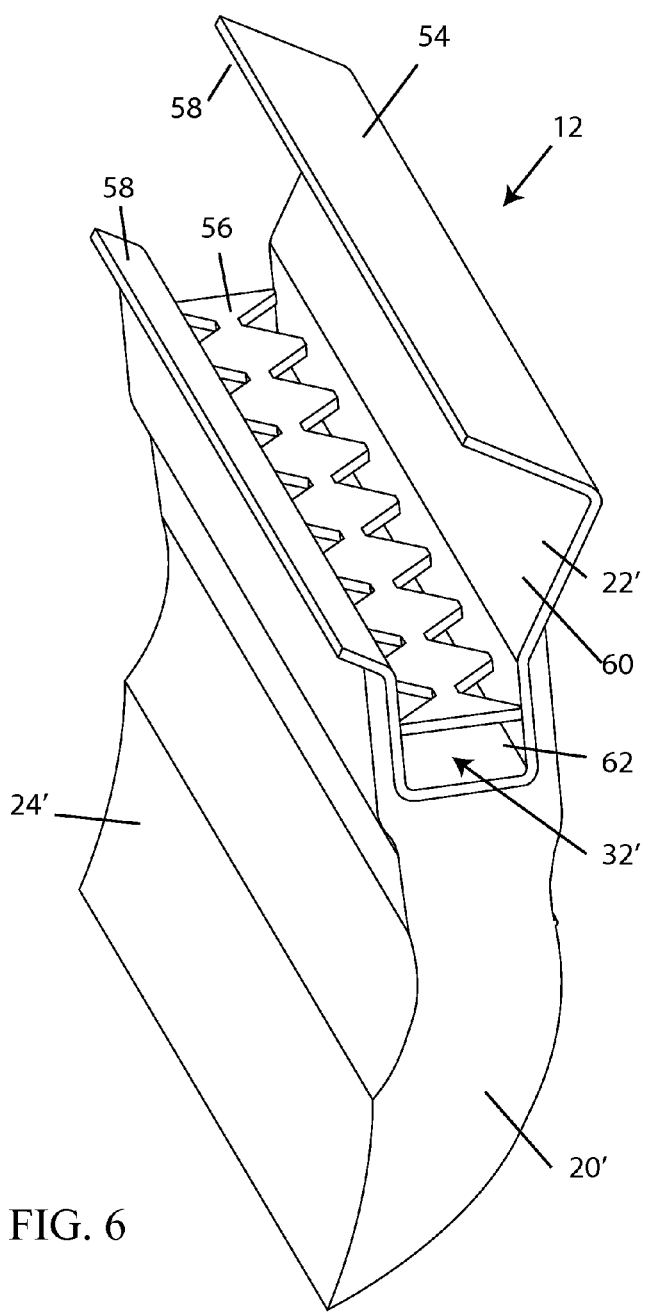
FIG. 6 depicts an alternative embodiment of the belt scraper.
Figure 7:
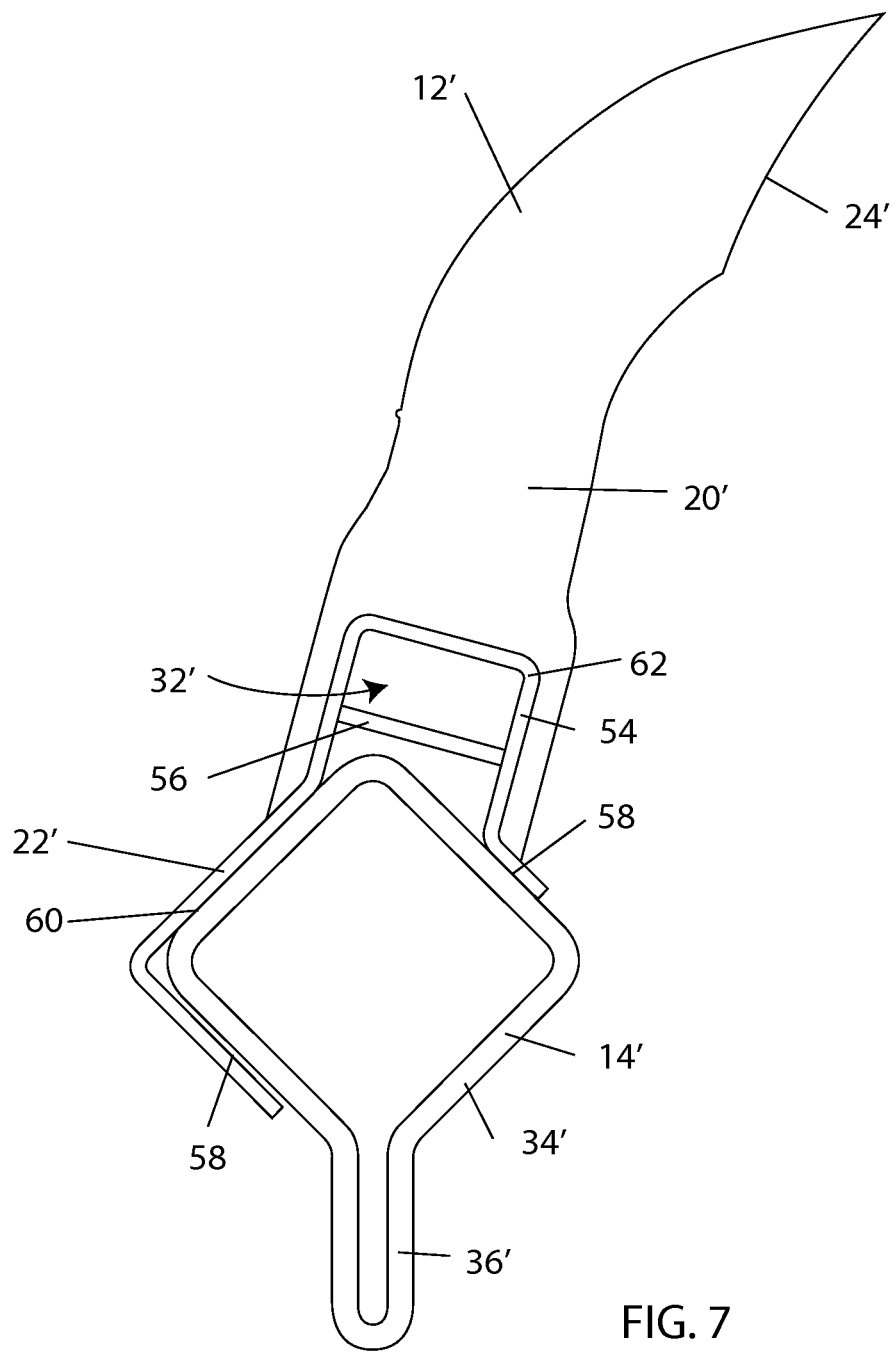
FIG. 7 depicts a side view of an assembly of the belt scraper shown in FIG. 6 mounted on the support member shown in FIG. 5 as viewed parallel to the longitudinal axis of the belt scraper.

An alternative embodiment of a belt scraper 12' is shown in FIGS. 6 and 7. This belt scraper 12' is interchangeable with the belt scraper described above but has a different base portion 22' that comprises a roll forged portion 54 and a brace 56. The polymeric portion 20' of the belt scraper 12' is basically the same as that of the other embodiment. The roll forged portion 54 of the base portion 22' of the belt scraper 12' is roll formed from flat sheet stock such that it has two opposing engagement surfaces 58 and an intermediate engagement surface 60 perpendicular thereto that collectively form a C-channel portion and engage three sides of the square portion 34, 34' of a support member 14, 14'. The rolling also forms a channeled protrusion 62 configured to extend outward from a corner of such a square portion of a support member 14, 14' when the belt scraper is attached thereto. The brace 56 is formed separately and is welded across the channel portion of the protrusion 62. The brace 56 as shown has undulating side edges to reduce the amount of material required to form the brace and to maximize the number of braces that can be cut from a single sheet of material (preferably via laser cutting). The brace 56 prevents the opposite sides of the protrusion 62 from spreading apart when the belt scraper 12' is under load. As shown in FIG. 7, the brace 56 is positioned such that the base portion 22' of the belt scraper 12', like the other embodiment of a belt scraper described above, comprises an opening 32' extending longitudinally through the base portion that is configured to receive the locking tabs 50 of the securing members 16.

Figure 8:
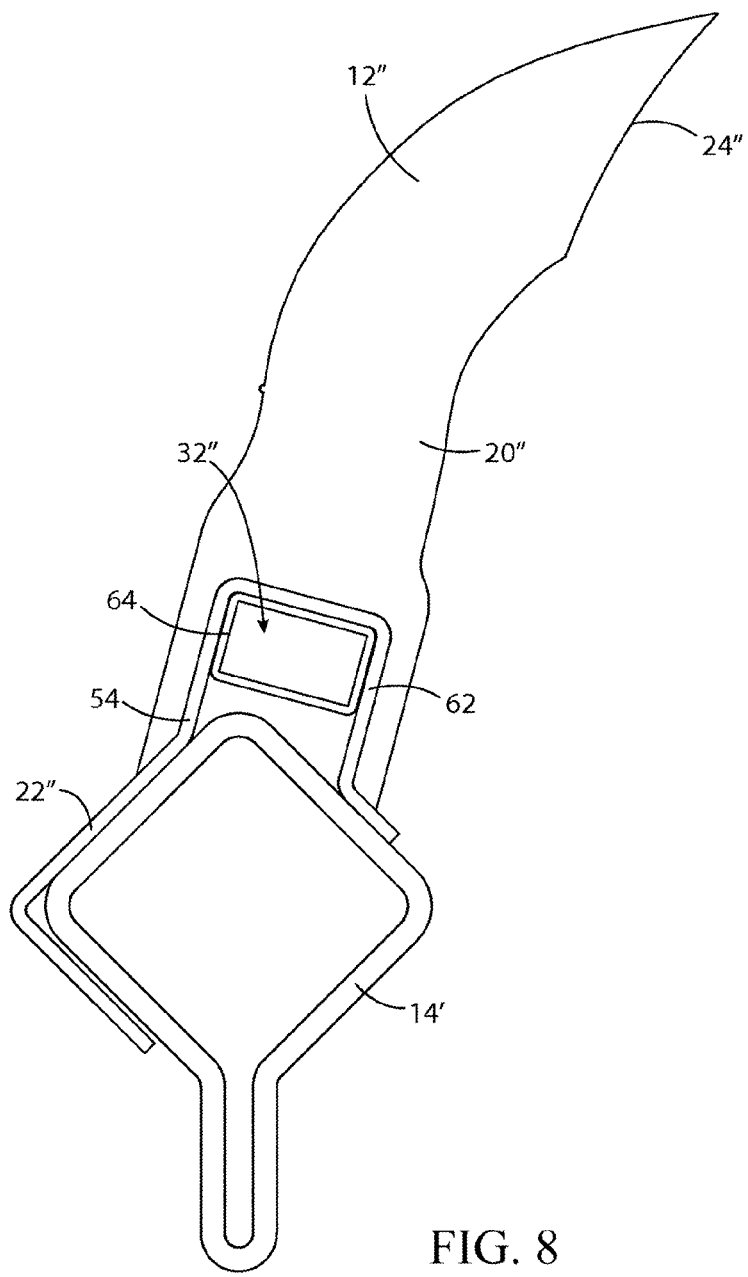
FIG. 8 depicts a side view of another embodiment of a belt scraper in accordance with the invention.
Figure 9:
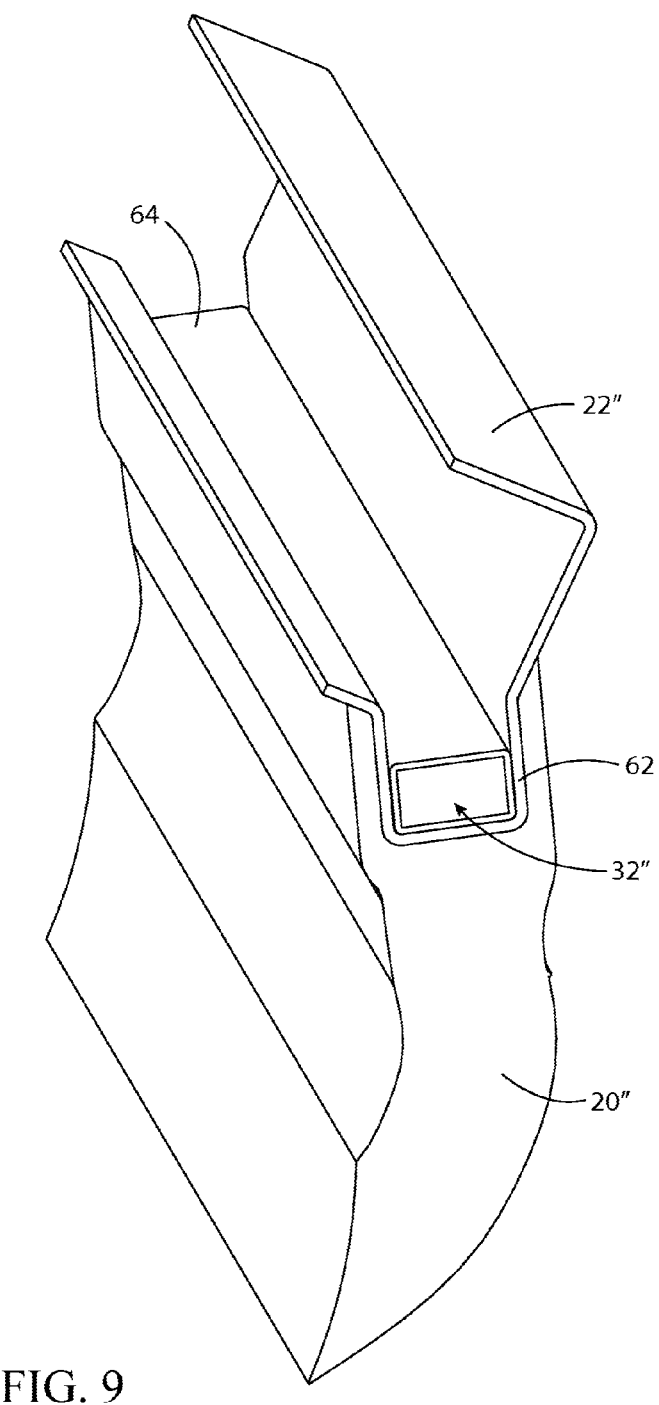
FIG. 9 depicts a perspective view of another embodiment of a belt scraper shown in FIG. 8.

Still another embodiment of a belt scraper 12" is shown in FIGS. 8 and 9. That embodiment of the belt scraper 12" is interchangeable with the other belt scrapers described above but has a different base portion 22" that comprises a base portion 22" formed partially of the same roll forged portion 54 as the embodiments shown in FIGS. 6 and 7. However, instead of also comprising a brace 56 like that of the embodiment shown in FIGS. 6 and 7, the base portion 22" of the embodiment shown in FIGS. 8 and 9 comprises a rectangular tube 64 that preferably is welded along two of its edges (the lower ones in FIG. 8) to the roll forged portion 54 inside the channeled protrusion 62. Thus, like the brace 56 of the second embodiment, the rectangular tube 64 prevents the opposite sides of the protrusion 62 from spreading apart when the belt scraper 12" is under load and forms an opening 32" extending longitudinally through the base portion 22" that is configured to receive the locking tabs 50 of the securing members 16 for securing the belt scraper 12" to the support member 14. The polymeric portion 20" of the belt scraper 12" shown in FIGS. 8 and 9 is the same as that of the belt scraper 12' embodiment shown in FIGS. 6 and 7.

In view of the configurations of the conveyor belt scraper assembly 10 as described above, it should be appreciated that the belt scraper 12 can be cut to length from a longer belt scraper and can be quickly replaced when worn. Furthermore, in view of the foregoing, it should be appreciated that the invention has several advantages over the prior art.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed, unless such an order is inherent or explicit.

What is claimed is:

1. A bulk material conveyor belt scraper comprising a polymeric portion and a metal base portion, the belt scraper extending longitudinally along a longitudinal axis, the base portion comprising a main channel portion that forms two parallel opposing engagement surfaces and an intermediate engagement surface perpendicular to the opposing engagement surfaces, the opposing engagement surfaces and the intermediate engagement surface being parallel to the longitudinal axis, the opposing engagement surfaces and the intermediate engagement surface defining a main channel region therebetween and being configured and adapted to collectively contact three sides of a square portion of a support member in a manner preventing the belt scraper from rotating about the support member when such a support member is positioned at least partially in the main channel region, the base portion also comprising a protruding portion that protrudes from the main channel portion and away from the main channel region, the protruding portion being configured and adapted to straddle a corner of the square portion of the support member when the opposing engagement surfaces and the intermediate engagement surface of the base portion contact the support member.

2. The bulk material conveyor belt scraper of claim 1 wherein a single piece of homogeneous metal material forms the main channel portion and the protruding portion of the base portion.

3. The bulk material conveyor belt scraper of claim 2 wherein an opening extends longitudinally through the protruding portion of the base portion of the belt scraper and is encircled by the base portion.

4. The bulk material conveyor belt scraper of claim 3 wherein the base portion comprises a rectangular tube that is attached internally to the protruding portion of the base portion and that extends longitudinally parallel to the longitudinal axis, and the rectangular tube defines the opening.

5. The bulk material conveyor belt scraper of claim 1 wherein a first piece of homogeneous metal material forms the main channel portion of the base portion, a second piece of homogeneous metal material forms the protruding portion of the base portion, the first piece is welded to the second piece, an opening extends longitudinally through the protruding portion of the base portion of the belt scraper, and the opening is encircled collectively by the main channel portion and the protruding portion of the base portion of the belt scrapper.

6. A bulk material conveyor belt scraper assembly comprising:
   the bulk material conveyor belt scraper of claim 1; and
   a support member extending parallel to the longitudinal axis, at least a portion of the support member having a square cross-section with four sides, the support member being positioned within the main channel region of the main channel portion of the base portion of the belt scraper with the opposing engagement surfaces and the intermediate engagement surface of the base portion collectively in contact with three of the sides of the support member in a manner preventing the belt scraper from rotating about the support member and in a manner such that the protruding portion straddles a corner of the square portion of the support member.

7. The bulk material conveyor belt scraper assembly of claim 6 wherein an opening extends longitudinal through the protruding portion of the base portion of the belt scraper and is encircled by the base portion.

8. The bulk material conveyor belt scraper assembly of claim 7 wherein the assembly comprises a pair of securing members, each of the securing members comprises a locking protrusion and is configured and adapted to slideably attach to the support member, the locking protrusions of the securing members are configured to at least partially extend into the opening of the belt scraper from longitudinally opposite sides of the belt scraper in a manner securing the belt scraper to the support member.

9. The bulk material conveyor belt scraper assembly of claim 8 wherein each of the locking members encircles the support member.

10. The bulk material conveyor belt scraper assembly of claim 6 wherein the support member comprises a stiffening rib that is attached to the portion of the support member that has the square cross-section, and the stiffening rib extends longitudinal parallel to the longitudinal axis and protrudes obliquely from a corner of the portion of the support member that has the square cross-section opposite the corner of the support member straddled by the protruding portion of the base portion of the belt scraper.

11. The bulk material conveyor belt scraper assembly of claim 10 wherein an opening extends longitudinal through the protruding portion of the base portion of the belt scraper and is encircled by the base portion, the assembly comprises a pair of securing members, each of the securing members comprises a locking protrusion and is configured and adapted to slideably attach to the support member, the locking protrusions of the securing members are configured to at least partially extend into the opening of the belt scraper from longitudinally opposite sides of the belt scraper in a manner securing the belt scraper to the support member.

* * * * *